United States Patent
Ishii (10) Patent No.: US 9,498,722 B2
(45) Date of Patent: Nov. 22, 2016

(54) USER ORGANIZING APPARATUS, USER ORGANIZING METHOD, AND CLOUD COMPUTING SYSTEM

(75) Inventor: Makoto Ishii, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 213 days.

(21) Appl. No.: 14/351,736

(22) PCT Filed: May 24, 2012

(86) PCT No.: PCT/JP2012/003404
§ 371 (c)(1),
(2), (4) Date: Apr. 14, 2014

(87) PCT Pub. No.: WO2013/065209
PCT Pub. Date: May 10, 2013

(65) Prior Publication Data
US 2014/0274393 A1    Sep. 18, 2014

(30) Foreign Application Priority Data

Oct. 31, 2011    (JP) ................................. 2011-239336

(51) Int. Cl.
| | |
|---|---|
| A63F 9/24 | (2006.01) |
| A63F 13/69 | (2014.01) |
| G06Q 10/10 | (2012.01) |
| A63F 13/335 | (2014.01) |

(52) U.S. Cl.
CPC ............. *A63F 13/69* (2014.09); *G06Q 10/101* (2013.01); *A63F 13/335* (2014.09); *A63F 2300/407* (2013.01)

(58) Field of Classification Search
CPC ..... H04L 65/403; A63F 13/06; A63F 13/10; A63F 13/12; A63F 2300/407; G06Q 10/101
See application file for complete search history.

(56) References Cited

U.S. PATENT DOCUMENTS

| | | | | |
|---|---|---|---|---|
| 7,311,608 | B1 * | 12/2007 | Danieli | ................... A63F 13/12 |
| | | | | 463/42 |
| 7,841,946 | B2 * | 11/2010 | Walker | .................... A63F 13/12 |
| | | | | 463/42 |

(Continued)

FOREIGN PATENT DOCUMENTS

| | | |
|---|---|---|
| CN | 1499415 A | 5/2004 |
| CN | 101238494 A | 8/2008 |

(Continued)

OTHER PUBLICATIONS

Readme.txt. Kega Fusion 3.64. Online. 2010. Accessed via the Internet. Accessed Dec. 22, 2015. <URL: http://www.carpeludum.com/download/Fusion364.zip>.*

(Continued)

*Primary Examiner* — Dmitry Suhol
*Assistant Examiner* — Carl V Larsen
(74) *Attorney, Agent, or Firm* — Matthew B. Dernier (57) ABSTRACT

A participation inviting block invites users wanting to participation in same content to be executed in a shared manner upon a notification from a promoter client apparatus connected to a content providing apparatus that makes two or more client apparatuses execute the same content in a shared manner through a network. An information notifying block references a user information storage block storing content provided by the content providing apparatus, information for identifying a user to whom the content was provided, and skill level information suggestive of a skill level of that user with respect to the content by linking the content, the information, and the skill level information in order to get the skill level information with respect to the content for which the participation was invited for each user wanting the participation accepted by the participation inviting block.

8 Claims, 6 Drawing Sheets

| CONTROLLER PORT ID | ALLOCATALE USER ID | SKILL LEVEL |
|---|---|---|
| 1P | UID00005 | 21 |
| | UID00006 | 103 |
| | UID00007 | 7 |
| | UID00008 | 40 |
| 2P | UID00009 | 38 |
| | UID00010 | 110 |
| | UID00011 | 12 |
| | UID00012 | 10 |
| 3P | UID00013 | 98 |
| | UID00014 | 5 |
| | UID00015 | 0 |
| | UID00016 | 78 |
| 4P | UID00017 | 113 |
| | UID00018 | 0 |
| | UID00019 | 72 |
| | UID00020 | 40 |

(56) References Cited

U.S. PATENT DOCUMENTS

| | | | |
|---|---|---|---|
| 8,342,960 B2 | 1/2013 | Tominaga | |
| 8,888,600 B2 | 11/2014 | Nguyen | |
| 2006/0046819 A1 | 3/2006 | Nguyen | |
| 2006/0205518 A1* | 9/2006 | Malabuyo | A63F 13/10 463/43 |
| 2006/0287096 A1* | 12/2006 | O'Kelley | A63F 13/12 463/42 |
| 2007/0016895 A1* | 1/2007 | Tan | G06F 9/45516 717/136 |
| 2008/0182668 A1 | 7/2008 | Tominaga | |
| 2009/0088256 A1 | 4/2009 | Kotsugai | |
| 2010/0017190 A1* | 1/2010 | Tanaka | A63F 13/02 703/25 |
| 2010/0261536 A1 | 10/2010 | Shibamiya | |
| 2013/0007013 A1* | 1/2013 | Geisner | A63F 13/12 707/748 |

FOREIGN PATENT DOCUMENTS

| | | |
|---|---|---|
| JP | 2007209628 A | 8/2007 |
| JP | 2008183066 A | 8/2008 |
| JP | 2009045335 A | 3/2009 |
| JP | 2011182031 A | 9/2011 |
| JP | 2011255080 A | 12/2011 |
| TW | 1233562 B | 6/2005 |

OTHER PUBLICATIONS

History.txt. Kega Fusion 3.64. Online. 2010. Accessed via the Internet. Accessed Dec. 12, 2015. <URL: http://www.carpeludum.com/download/Fusion364.zip>.*

European Search Report for corresponding application EP 12845829.6, dated Apr. 1, 2015.

Office Action for corresponding application CN 201280051984.5, dated Aug. 3, 2015.

International Search Report for corresponding application PCT/2012/003404, dated Jul. 17, 2012.

Office Action for corresponding JP Application No. 2011-239336, dated Jul. 10, 2014.

International Preliminary Report on Patentability and Written Opinion for corresponding application PCT/2012/003404, May 15, 2014.

* cited by examiner

| CONTENT ID | USER INFORMATION | PROVIDED INFORMATION | CURRENT STATUS |
|---|---|---|---|
| CID0001 | USER 0001 | 33 TIMES / 514 MINUTES | PROVIDING |
| | USER 0002 | 5 TIMES / 83 MINUTES | LOGOFF |
| | ⋮ | ⋮ | ⋮ |
| | USER XXXX | 17 TIMES / 132 MINUTES | PROVIDING |
| ⋮ | ⋮ | ⋮ | ⋮ |
| CIDZZZZ | USER 0001 | 12 TIMES / 208 MINUTES | CID0001 |
| | ⋮ | ⋮ | ⋮ |
| | USER YYYY | 47 TIMES / 710 MINUTES | PROVIDING |

| CONTROLLER PORT ID | ALLOCATALE USER ID | SKILL LEVEL |
|---|---|---|
| 1P | UID00005 | 21 |
| | UID00006 | 103 |
| | UID00007 | 7 |
| | UID00008 | 40 |
| 2P | UID00009 | 38 |
| | UID00010 | 110 |
| | UID00011 | 12 |
| | UID00012 | 10 |
| 3P | UID00013 | 98 |
| | UID00014 | 5 |
| | UID00015 | 0 |
| | UID00016 | 78 |
| 4P | UID00017 | 113 |
| | UID00018 | 0 |
| | UID00019 | 72 |
| | UID00020 | 40 |

| CONTROLLER PORT ID | USER ID |
|---|---|
| 1P | UID00001 |
| 2P | UID00002 |
| 3P | UID00003 |
| 4P | UID00004 |

FIG. 7

USER ORGANIZING APPARATUS, USER ORGANIZING METHOD, AND CLOUD COMPUTING SYSTEM

TECHNICAL FIELD

The present invention is related with a user organizing apparatus, a user organizing method, and a cloud computing system.

BACKGROUND ART

The recent rapid advance in the network communication technologies including the Internet has realized the provision of so-called cloud services by which users can get various kinds of content via networks. Use of cloud computing services allows each user to use particular pieces of content even if the user does not have application programs for realizing these pieces of content.

In addition, the advance in recent computer technologies is remarkable. For example, in the past, such content costly in computation as game applications required the hardware dedicated to the execution, but a so-called game emulator that executes game applications by emulating the hardware in the software approach has become practical.

SUMMARY

Technical Problem

Providing game emulators through cloud services allows game consoles to be virtual. Connection between virtual game consoles through the network of two or more users allows them to play games by sharing one piece of content without having to really gather at a certain place. The ability of playing in a cooperative manner through a network, such as individual competitions or team competitions, increases the number of users who can participate in cooperative plays. Hence, technologies of managing the users who play by sharing content through networks are required.

Therefore, the present invention addresses the above-identified and other problems associated with related-art methods and apparatuses and solves the addressed problems by providing technologies of managing user groups who play games by sharing the content provided by a cloud computing system.

Solution to Problem

In order to solve the above-addressed problems, there is provided a user organizing apparatus practiced as one embodiment of the present invention. This apparatus has a participation inviting block configured, being connected to a content providing apparatus that makes a plurality of client apparatuses execute same content in a shared manner through a network, to invite users wanting to participate in the same content to be executed in a shared manner upon a notification from a promoter client apparatus that is one of the plurality of client apparatuses; an information notifying block configured to reference a user information storage block for storing content provided by the content providing apparatus, information for identifying a user to whom the content was provided, and skill level information suggestive of a skill level of the user with respect to the content by linking the content, the information, and the skill level information in order to get skill level information with respect to content for which participation was invited for each of users wanting participation accepted by the participation inviting block, thereby notifying the promoter client apparatus of the obtained skill level information; and a controller controlling block configured to allocate a virtual controller port in which an input signal for operating content provided by the content providing apparatus is entered to a client apparatus of a user accepted by the participation inviting block.

In another embodiment of the present invention, there is provided a user organizing method which is executed by a computational resource of a cloud computing system that makes two or more client apparatuses execute same content through a network. This method has steps of inviting, upon a notification from a promoter client apparatus that is one of the plurality of client apparatuses connected to the cloud computing system, users wanting to participate in the content to be executed in a shared manner; referencing a user information storage block for storing content provided by the cloud computing system, information for identifying a user to whom the content was provided, and skill level information suggestive of a skill level of the user with respect to the content by linking the content, the information, and the skill level information in order to get skill level information with respect to content for which participation was invited for each of users wanting participation, thereby notifying the promoter client apparatus of the obtained skill level information; and allocating a virtual controller port in which an input signal for operating content provided by the cloud computing system is entered to a client apparatus of a user accepted for participation.

There is provided a cloud computing system having two or more client apparatuses and two or more computational resources for providing content to these client apparatuses through a network. This cloud computing system is configured by a virtual console configured to make the plurality of client apparatuses execute same content in a shared manner through the network; a virtual controller port configured to get an input signal for operating content provided by the cloud computing system and output the obtained content to the content providing block; a participation inviting block configured to invite users wanting to participate in content provided by a content providing block upon a notification from a promoter client apparatus that is one of the plurality of client apparatuses; a user information storage block configured to store content provided by the content providing block, information for identifying a user to whom the content was provided, and skill level information suggestive of a skill level of the user with respect to the content by linking the content, the information, and the skill level information; an information notifying block configured to get skill level information of content for which participation was invited for each user wanting participation accepted by the participation inviting block by referencing the user information storage block and notify the promoter client apparatus of the obtained skill level information; and a controller controlling block configured to allocate the virtual controller port to a client apparatus of the user accepted by the participation inviting block.

It should be noted that any combinations of the above-mentioned component elements and any expressions of the present invention that are translated between method, apparatus, system, computer program, data structure, and recording media may also be practiced as additional embodiments of the present invention.

Advantageous Effect of Invention

As described above and according to the present invention, a technology of managing user groups playing games by sharing content provided by a cloud computing system is provided.

DESCRIPTION OF EMBODIMENT

The following describes embodiments. A user organizing apparatus related with an embodiment manages users who accepted the invitation for participation sent from a promoter who wants to execute content to be executed on a virtual console by sharing the content by two or more users. To be more specific, the user organizing apparatus selects the predetermined number of invited users from among the users who accepted the invitation for participation sent from the promoter and allocates controller ports for content control to the selected users.

The following describes an example in which, in a cloud computing system related with the embodiment, game content developed to be executed by dedicated hardware is executed by use of a game emulator. It is understood by those skilled in the art that content execution means are not limited to the use of a game emulator; namely, an example in which game content is executed directly by a PC (Personal Computer) without using a game emulator is also included in the present embodiment. It should also be noted that, for the convenience of description, the description will be done by use of an example in which game content is executed; however, the content to be executed is not limited to games, namely, the execution of non-game content, such as image editing software and other software programs requiring expert knowledge for operation, is included in the present embodiment.

Figure 1:
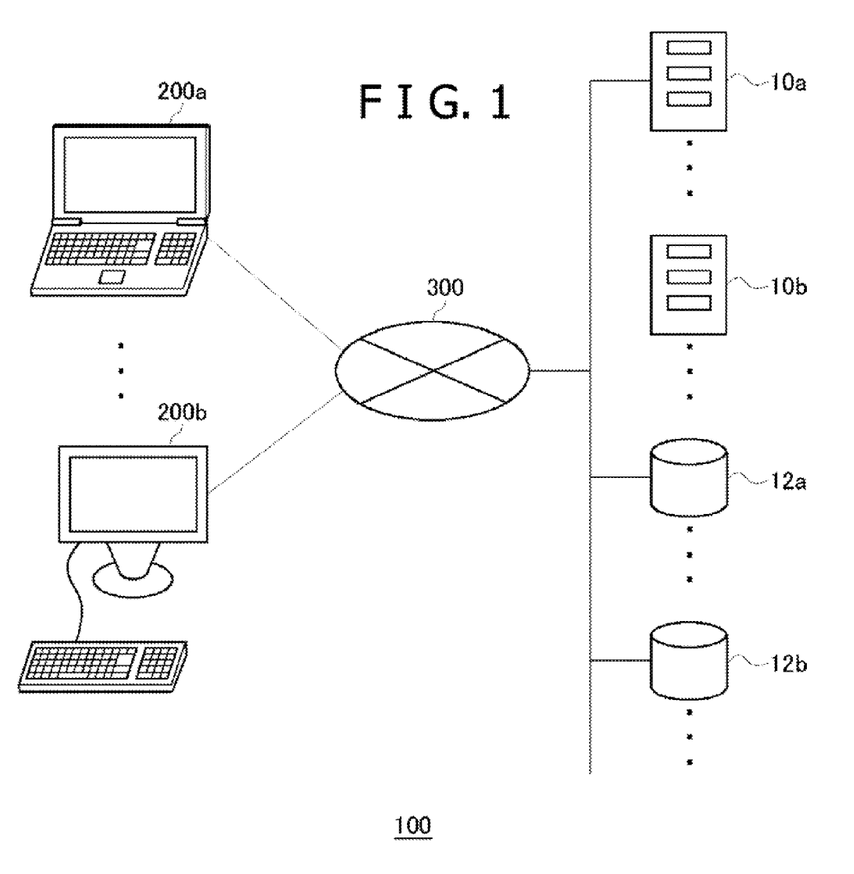
FIG. 1 is a schematic diagram illustrating an overview of a cloud computing system.

Now, referring to FIG. 1, there is shown an overview of a cloud computing system 100. In FIG. 1, client apparatuses 200a and 200b of two or more client apparatuses 200 that are generically referred to as a client apparatus 200. The client apparatus 200 is connected to two or more servers 10 and databases 12 through a network 300 such as the Internet. In FIG. 1, of the two or more servers 10, the servers 10a and 10b are shown. Further, of the two or more databases 12, the databases 12a and 12b are shown.

FIG. 1 shows a state in which the client apparatus 200 and the server 10 and so on are interconnected through the network 300, thereby schematically illustrating a real system configuration. However, users using the client apparatus 200 seldom recognize a system configuration of the server 10 and the database 12 including the network 300. From the standpoint of users of the cloud computing system 100, the users need not understand a physical configuration and a software configuration of the cloud computing system 100 in receiving services, thereby giving the users an impression that the users use services as if these services popped out from clouds (Cloud) of networks.

In most cases, the client apparatus 200 has a computational resource such as a CPU (Central Processing Unit) or the like and therefore can execute at least a part of applications in the local environment of the client apparatus 200. However, whether applications are executed by the local computational resource or the computational resource of the cloud computing system 100 on a network is not important for the users of the client apparatus 200 because both are the same in the availability of services. Therefore, "computational resource of cloud computing system" or simply "computation resource" herein denotes at least one of the computational resource of the client apparatus 200 and the computational resource of the server 10 and so on of the cloud computing system 100.

Figure 2:
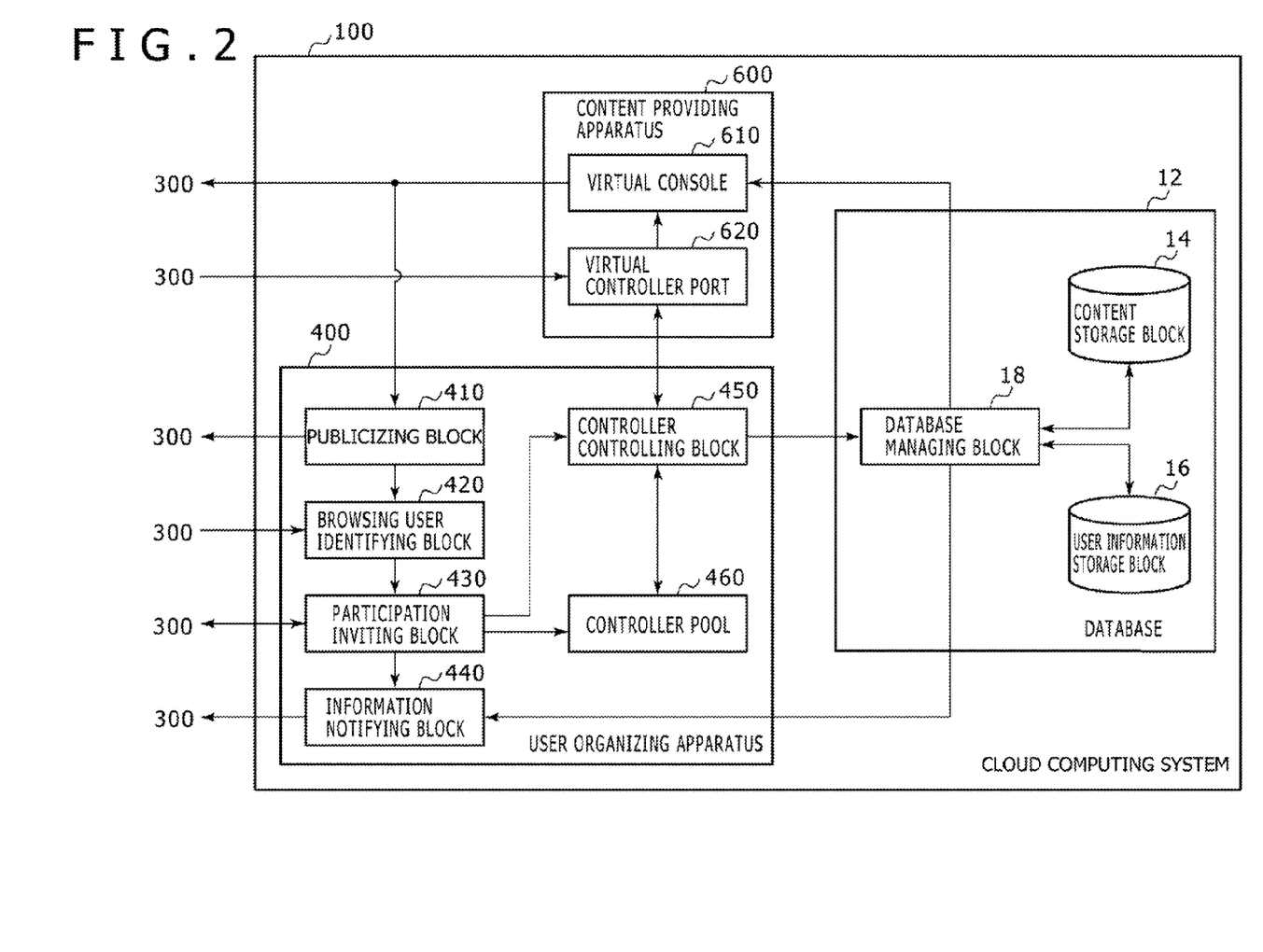
FIG. 2 is a block diagram schematically illustrating a functional configuration of a cloud computing system practiced as one embodiment.

Referring to FIG. 2, there is shown a block diagram schematically illustrating a functional configuration of the cloud computing system 100 related with an embodiment of the present invention. The cloud computing system 100 includes the database 12, a user organizing apparatus 400, and a content providing apparatus 600. It should be noted that the database 12, the user organizing apparatus 400, and the content providing apparatus 600 are each a conveniently collected group of functions. Therefore, the functions provided by the database 12, the user organizing apparatus 400, and the content providing apparatus 600 may be realized in one physical unit or in two or more different units that operate on a cooperative manner.

The content providing apparatus 600 further includes a virtual console 610 and a virtual controller port 620. The virtual console 610 executes content stored in a content storage block 14. The virtual console 610 can be realized by an emulator that is executed by the computational resource of the cloud computing system 100 for example. Details of the content storage block 14 will be described later.

As described above, the advance in recent computer technologies is remarkable. For example, in the past, costly content such as game content required hardware dedicated to the execution; recently, however, a so-called game emulator that executes game content by emulating the hardware has become practical. Executing such an emulator by the computational resource of the cloud computing system 100 can make consoles virtual. The user of the cloud computing system 100 may receive the provision of content if the user can access the virtual console 610 even if the user does not have content or the hardware dedicated to the execution of the content.

The console virtualization allows the virtualization of a controller port in which an input signal for operating content provided by the virtual console 610 is entered. The virtual controller port 620 is a controller port virtualized by the software that is executed by the computational resource and the virtual console 610 executes content in accordance with various operation signals entered from the virtual controller port 620.

Virtualization of the console and the controller port allows the sharing of one piece of content through the content providing apparatus 600 even if two or more users does not physically gather at a same place. The virtualization provides an environment in which two or more users distributed on a network are teamed to play a fighting game by interchanging the users or content for one person is executed by two or more users alternately.

A huge number of game content applications have been developed so far, so that it is good to manage these content applications by means of dedicated servers and databases. Accordingly, the database 12 further has a database managing block 18, the content storage block 14, and a user information storage block 16. Managing lots of pieces of content by servers and databases on a network allows the user to receive the provision of desired game applications from among many options. An operator and manager of the cloud computing system 100 can produce new businesses by reusing game content developed in the past.

The content storage block 14 stores content that is provided by the content providing apparatus 600 to the client apparatus 200 through the network 300. As described above, the content providing apparatus 600 gets from the content storage block 14 the content to be provided to the user, the obtained content then being executed by the computational resource.

The user information storage block 16 links the content provided in the past by the content providing apparatus 600 to any one client apparatus 200 with information related with the provision of this content and stores the linked content. "Information related with the provision of content" herein denotes the information related with the popularity of content and the information indicative of the skill level of a user related with content who was provided therewith, for example. Information indicative of the user being currently provided with content is also included in the information related with the provision of content.

"Information about the popularity of content" denotes the number of times a particular piece of content was provided to any one user and a total time of how long a particular piece of content was provided to the user. Because popular content is executed by many users, it is possible that the number of content provision times and the provision length of time increase. Therefore the number of content provision times and the content provision length of time provide the information indicative of the popularity of that content.

"Information indicative of the skill level of a user related with content who was provided therewith" denotes the number of times each user was provided with content and the length of time in which content was provided, for example. It is possible that a user with the high number of times a particular piece of content was provided or a user with a long execution time of a particular piece of content is highly familiar with that content. Consequently, the number of times a particular piece of content was provided to a particular user and the length of the provision of a particular piece of content to a particular user provide the information indicative of the skill level of that user with respect to that content.

The database managing block 18 manages the information stored in the content storage block 14 and the user information storage block 16. To be more specific, the database managing block 18 gets the content from the content storage block 14 to be provided to the content providing apparatus 600 and stores the user information obtained from the user organizing apparatus 400 (detail thereof will be described later) into the user information storage block 16.

Figure 3:
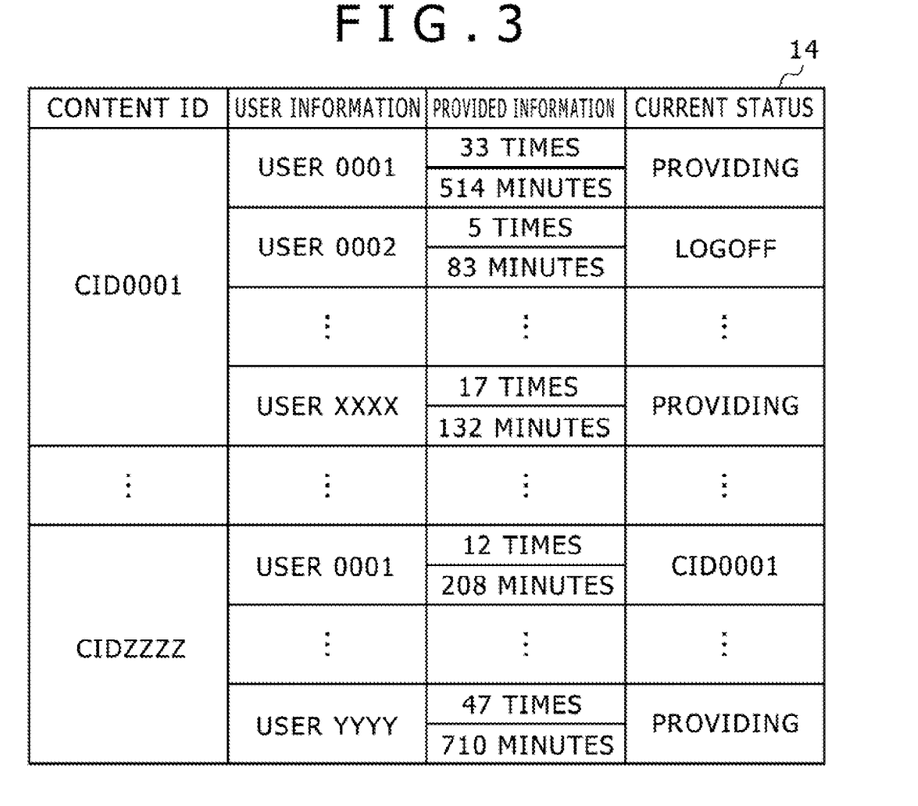
FIG. 3 is a diagram schematically illustrating one example of a data structure in a user information storage block related with the embodiment.

Referring to FIG. 3, there is shown a diagram schematically illustrating one example of a data structure of the user information storage block 16 related with the embodiment. Each piece of content stored in the content storage block 14 and to be provided by the content providing apparatus 600 is allocated with a content ID (Identification) for uniquely identifying that content. The user information storage block 16 stores, for every content ID, the user information for identifying the user provided with that content. "User information" herein denotes a user ID uniquely allocated to each user, for example.

The user information storage block 16 stores content provided by the content providing apparatus 600 linked with information for identifying a user provided with that content and skill level information suggestive of the skill level of that user with respect to that content. The user information storage block 16 further stores the current status of the user provided with content. "Current status of the user" denotes information indicative whether or not the user is currently able to log in on the cloud computing system 100 and, if the user is currently logged in, which content is being provided to the user.

The following describes FIG. 2 again. The user organizing apparatus 400 further includes a publicizing block 410, a browsing user identifying block 420, a participation inviting block 430, an information notifying block 440, a controller controlling block 450, and a controller pool 460.

If two or more users execute the same content in a shared manner, two or more client apparatuses 200 are connected to the client apparatus 200 through the network 300. The participation inviting block 430 invites users desiring to participate in a content to be executed in a shared manner upon notification from a promoter client apparatus, one of the two or more client apparatuses 200.

"Promoter client apparatus" herein denotes the client apparatus 200 provided with content to be executed in a shared manner, for example. A user of a promoter client apparatus becomes the leader of a team who has power to invite participant users, select participant users, and allocate the virtual console 610 to participant users. In what follows, a user who uses a promoter client apparatus is sometimes referred to herein simply as "promoter user."

The information notifying block 440 references the user information storage block 16 through the database managing block 18. For each user desiring the participation accepted by the participation inviting block 430, the information notifying block 440 gets the skill level information about the content which invited participation and notifies the promoter client apparatus of the obtained skill level information. This allows the promoter user to know the skill level of each user who accepted the invitation. In what follows, a user who participate a game by accepting the invitation from the promoter user is sometimes referred to herein simply as "participant user."

The controller pool 460 stores the user information of the user desiring the participation accepted by the participation inviting block 430. The controller controlling block 450 allocates the virtual controller port 620 to the client apparatus 200 in which that is used by the user with the user information stored in the controller pool 460. Consequently an input signal from the client apparatus 200 that is used by a participant user is entered into the virtual console 610, thereby allowing the participant user to operate content.

Now, suppose that a promoter user promote a team-to-team fighting game such as a succor game for example. Also suppose that the promoter user invite four users including the promoter user as a first team and other four users as a second team that will fight with the first team. It should be noted here that a succor game is normally played with one team made up of 11 members, so that the four members of each team are operated by users while the remaining seven members are automatically operated by the program, each of these seven members being called NPC (Non Player Character).

The information notifying block 440 notifies the promoter client apparatus of the skill level related with the succor game to be played by the users who accepted the invitation. Referencing the notified skill level of each user, the promoter user can determine participant users. The controller controlling block 450 allocates the virtual controller port 620 in accordance with the determination by the promoter user. This allows the promoter user to organize a team well balanced in skill level. It is also practicable to adjust, in accordance with user skill level, the skill level of NPC that is automatically operated by the program executed by the virtual console 610.

The user information about a user who are not selected as the promoter user and not allocated to the virtual controller port 620 is stored in the controller pool 460. The promoter user can also replace a participant user by another user stored in the controller pool 460 during the play of succor game. This can be realized by the controller controlling block 450 by changing, upon an instruction from the promoter user, the client apparatus 200 to which the virtual controller port 620 is allocated. In this case, by pausing the game through the virtual console 610, the promoter user makes the controller controlling block 450 change the allocation to the virtual controller port 620.

Alternatively, participant users may be changed by changing a player to be operated by that virtual controller port 620 to NPC until the changing of the allocation to the virtual controller port 620 is completed. This can be realized by a program executed by the virtual console 610, the program controlling to change a player to be operated to NPC while no participant user is allocated to the virtual controller port 620. Consequently, when the controller controlling block 450 allocates the virtual controller port 620 to the client apparatus 200 while content is being provided, the virtual console 610 can realize that the virtual console 610 gets an input signal from the newly allocated virtual controller port 620 without interference with the provision of content.

For another example, assume that the promoter user play the content of a so-called shooting game. It is also assumed that this shooting game be a one-player game in which the promoter user operates a character to be operated in order to destroy enemy characters while keeping off obstacles and ducking the attacks of enemy characters.

Here, assume that, while the promoter user is playing a shooting game, the promoter user desire to be replaced by another user because the biggest enemy character that the promoter user cannot destroy because the promoter user does not have a skill level enough for smashing such an enemy character. In this case, the promoter user invites, through the participation inviting block 430, a participant user who can replace the promoter user. Some of the unspecified applicants may frivolously apply although despite of their low skill level. Therefore, the promoter user can select a participant user who is reliable as the replacement by checking the skill levels of applicant users sent from the information notifying block 440.

For another situation, assume that the promoter user cannot continue playing the game, though for a short time, due to disruptions such as a doorbell or phone call or going to restroom, for example. In such a situation, the promoter user instructs the virtual console 610 to pause the game and invites a replacement user through the participation inviting block 430. If the number of participant users accepted by the participation inviting block 430 is greater than the maximum number of recruits, the controller controlling block 450 allocates the virtual controller port 620 preferentially to the client apparatus 200 of the user having a higher skill level of the content for which participation was invited over the client apparatus 200 of the user having a lower skill level with respect to that content. When the virtual controller port 620 is allocated by the controller controlling block 450 to the client apparatus 200 of any one user, the virtual console 610 restarts the game. Consequently, the participant user can continue the game as the replacement of the promoter user.

Because the controller controlling block 450 determines participant users on the basis of the skill levels of the users who applied for the invitation, the promoter user can discontinue the operation of the client apparatus 200 upon the invitation of participants by the participation inviting block 430. This allows the promoter user to promptly respond to what the promoter user has to do except playing the game. Although not illustrated, dedicated "emergency participation notification icon" may be prepared in the execution screen of content in order to make a notification of emergency invitation. A setup may be made in which, when the promoter user clicks this icon, the user organizing apparatus 400 executes a series of processing operations from the pause of game, the invitation of participants, to the allocation of virtual controller ports.

The publicizing block 410 makes public the execution screen of the content provided by the content providing apparatus 600 in a variety of browsable forms through the network 300. Users of the cloud computing system 100 are able to realtime browse the execution screen of the content being provided to other users publicized by the publicizing block 410 through the network 300. The browsing user identifying block 420 identifies each user browsing the execution screen publicized by the publicizing block 410. To be more specific, the browsing user identifying block 420 gets the user ID of each user browsing the execution screen publicized by the publicizing block 410.

It is often possible that users browsing the execution screen of the content currently being provided to the promoter user are those who are interested in that content. Hence, it is expected that the users browsing the execution screen of the content currently being provided to the promoter user are also those who are experienced in that content. Therefore, the participation inviting block 430 may notify the users identified by the browsing user identifying block 420 of the invitation of participation. This allows the invitation of participant users from the unspecified number of user population the participant users experienced in the content, namely, from the user population expected to include users of high skill level.

Figure 4:
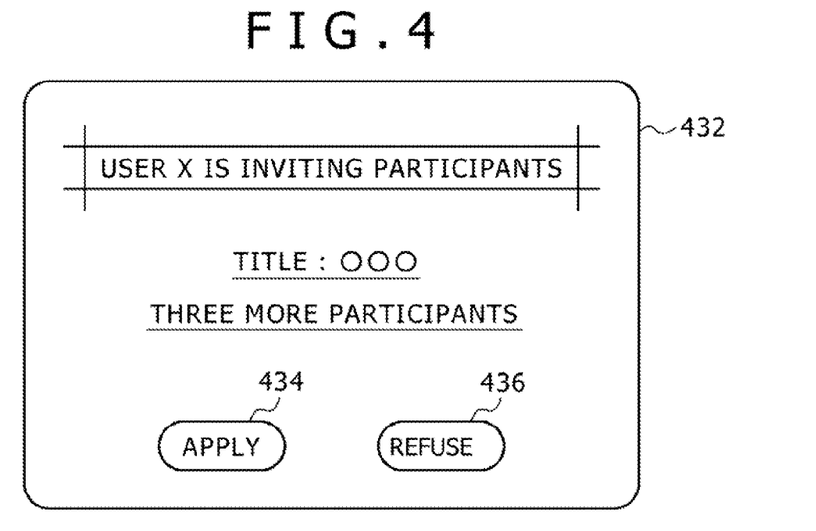
FIG. 4 is a diagram illustrating one example of a notice screen for participant user invitation generated by a participation inviting block related with the embodiment.

Referring to FIG. 4, there is shown a diagram illustrating one example of a notification screen 432 for participant user invitation generated by the participation inviting block 430 related with the embodiment. The participation inviting block 430 notifies the user browsing the execution screen of the content currently being provided to the promoter user of the notification screen 432 shown in FIG. 4 through the network 300, for example. The notification screen 432 is displayed on a display block (not shown) of the client apparatus 200 of the user notified from the participation inviting block 430. As shown in FIG. 4, the notification screen 432 shows the title name of the content concerned and the maximum number of users invited.

Having received the notification screen 432, the user, if the user accepts the invitation from the promoter user, clicks a apply icon 434 that is an interface for transmitting thereof. When the user clicks the apply icon 434, the user information of that user is stored in the controller pool 460 through the network 300 and the participation inviting block 430. If the user who received the notification screen 432 does not accept the invitation from the promoter user, the refusing user may click a refuse icon 436 to close the notification screen 432.

Figure 5:
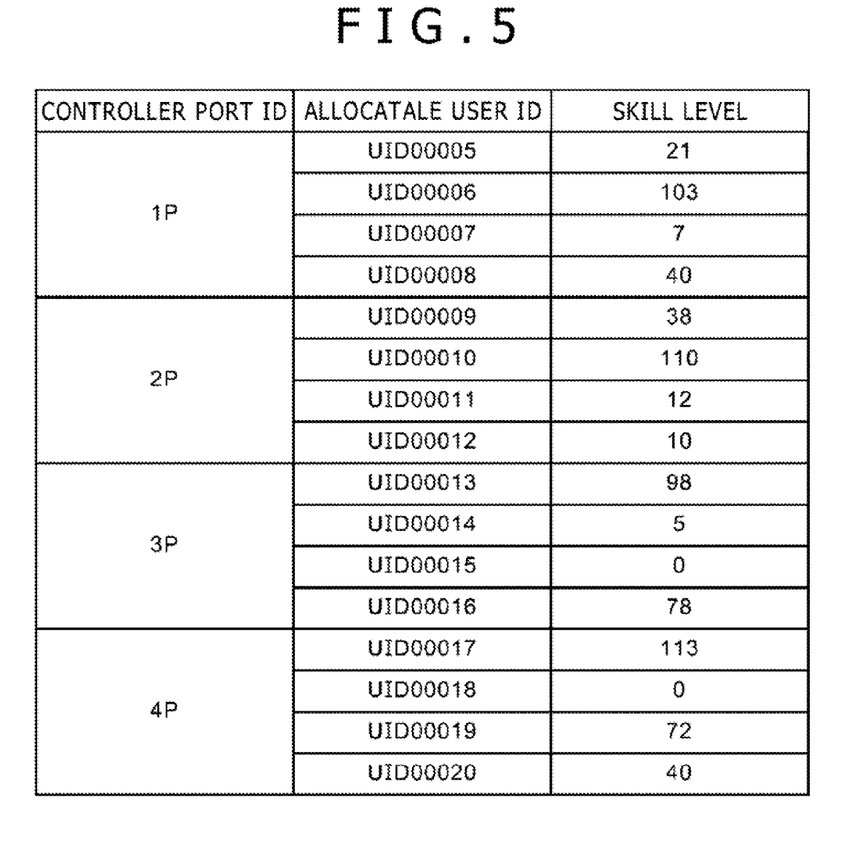
FIG. 5 is a diagram schematically illustrating one example of a data structure in a controller pool related with the embodiment.

Referring to FIG. 5, there is shown a diagram schematically illustrating one example of a data structure in the controller pool 460 related with the embodiment. For the convenience of description, it is assumed that four ports, first to fourth, be prepared for the virtual controller port 620 to allocate ports to four users. In order to identify the first to fourth ports, a unique controller port ID is allocated to each of these ports. In FIG. 5, these four controller port ID are respectively expressed by "1P," "2P," "3P," and "4P."

Each controller port ID is stored linked with the user IDs of users who are candidates for the participant user allocated to that virtual controller port 620. In FIG. 5, each user ID is expressed by "UID" and a five-digit number. Each user ID is stored linked with a skill level for the content for which that user was invited. The skill level is obtained by the controller controlling block 450 from the user information storage block 16 through the database managing block 18 and stored in the controller pool 460. In FIG. 5, the skill level is quantified in non-negative integer, the greater the number, the higher the skill level. The method of skill level quantification may be determined by an experiment by reflecting the number of times content was provided and the length of time in which content was provided, for example.

Figure 6:
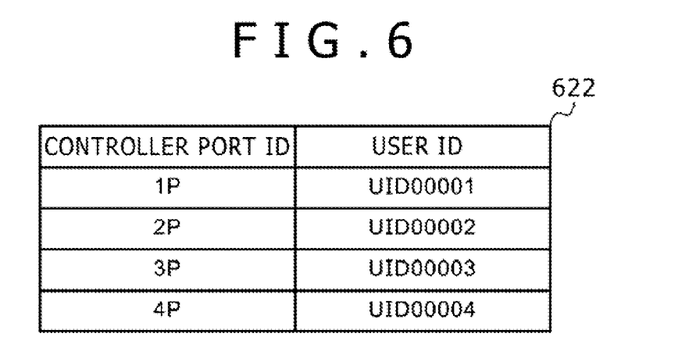
FIG. 6 is a diagram schematically illustrating a management table for managing client apparatuses to be allocated to virtual controller ports related with the embodiment.

Referring to FIG. 6, there is shown a diagram schematically illustrating a management table 622 for managing the client apparatus 200 to be allocated to the virtual controller port 620 related with the embodiment. The management table 622 is stored in a temporary memory not shown of the virtual controller port 620, for example. As shown in FIG. 6, the management table 622 is stored linked with controller port IDs and IDs of users of the client apparatus 200 allocated to each virtual controller port 620. By referencing the management table 622, the virtual controller port 620 can recognize the client apparatus 200 allocated to each virtual controller port 620.

Figure 7:
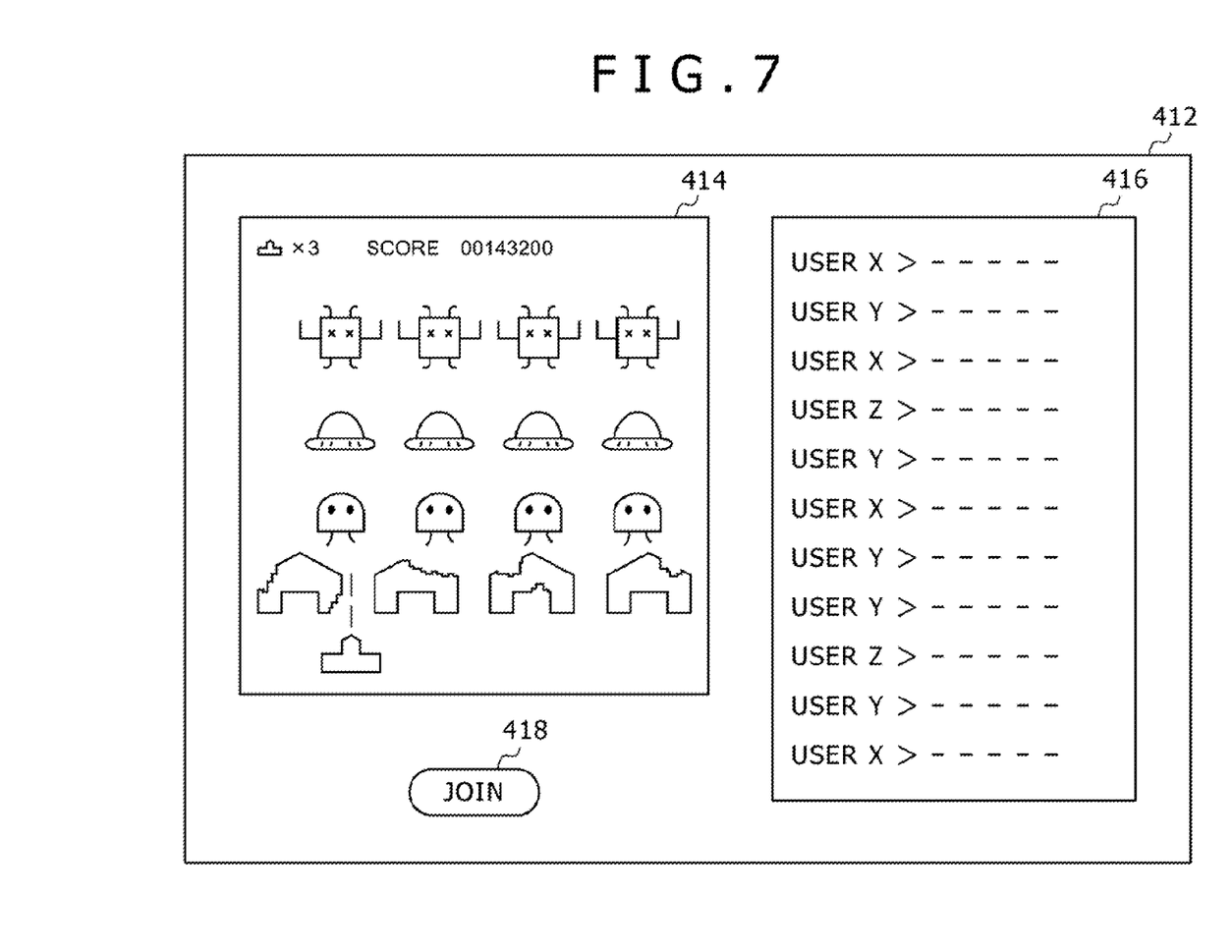
FIG. 7 is a diagram illustrating one example of a publicized screen that is publicized by a publicizing block related with the embodiment.

Referring to FIG. 7, there is shown a diagram illustrating one example of a public screen 412 made public by the publicizing block 410 related with the embodiment. As shown in FIG. 7, the public screen 412 has a communication interface 416 for displaying comments from a user browsing an execution screen 414 of the content currently being provided to the promoter user. This prompts communication between the users browsing the execution screen 414. The public screen 412 has a join icon 418 that is an interface for the user browsing the execution screen 414 to send the intention of participating in the content to be executed by the promoter user. When the user clicks the join icon 418 with a user interface such as a mouse, the user's intention to participate in the content is sent to the client apparatus 200 of the promoter user. When the promoter user approves the participation, matching between both users is executed, thereby realizing a cooperative play of both users through the content over the network 300.

Figure 8:
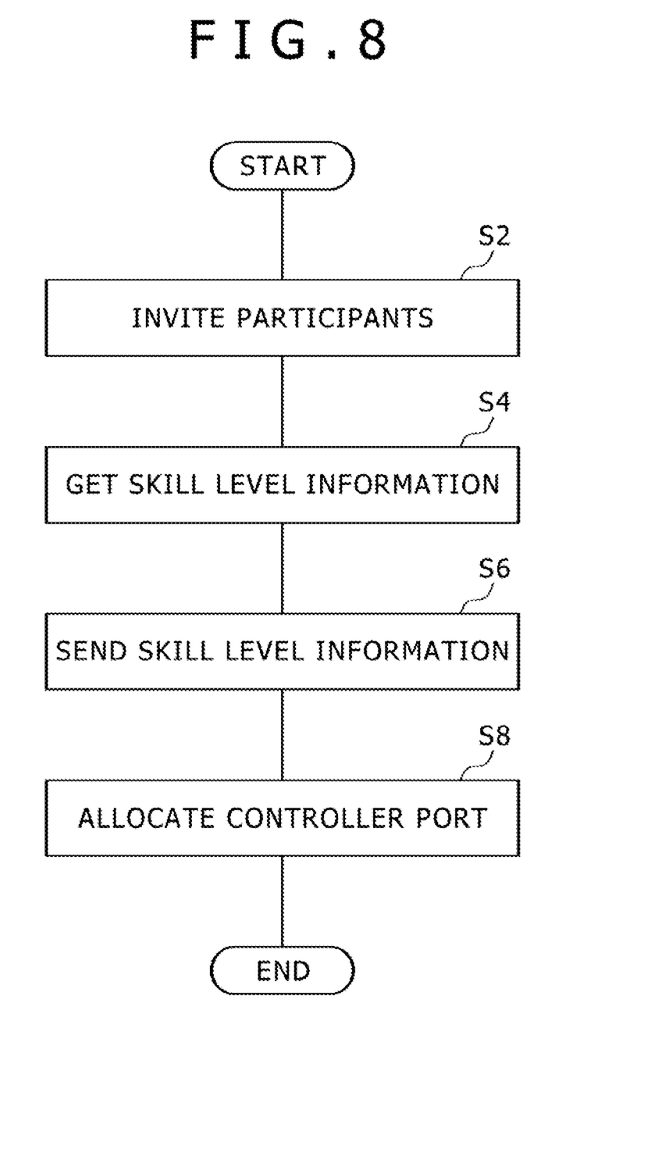
FIG. 8 is a flowchart indicative of a flow of processing executed by the cloud computing system related with the embodiment.

Referring to FIG. 8, there is shown a flowchart indicative of a flow of the processing operations of the cloud computing system 100 related with the embodiment. The processing operations indicated by this flowchart are repeatedly executed while a promoter user is provided with content.

Upon an instruction from the promoter user, the participation inviting block 430 invites participant users who want to participate in a team that plays content in a shared manner (S2). The information notifying block 440 gets the skill levels of the users who accepted the invitation from the promoter user in the content to be played from the user information storage block 16 (S4).

The information notifying block 440 notifies the client apparatus 200 of the promoter user of the skill level of each user obtained from the user information storage block 16 (S6). The controller controlling block 450 allocates the virtual controller port 620 to the client apparatus 200 of the user who accepted the invitation from the promoter user (S8).

The configuration described above executes the following operations. Upon an instruction from the promoter user who is a user of the cloud computing system 100 related with the embodiment, the participation inviting block 430 publicizes the notification screen 432 for inviting users wanting to participate in the content onto the network 300. Browsing the notification screen 432, the controller pool 460 stores the user information of the users who accepted the invitation from the promoter user.

The controller controlling block 450 selects participant users on the basis of the instruction from the promoter user or the skill level of each user in the content in which the user participates. The controller controlling block 450 allocates the virtual controller port 620 to the client apparatus 200 that is used by a selected participant user. This allows the user organizing apparatus 400 to manage the candidates of two or more participant users to whom the virtual controller port 620 is allocated.

As described above and according to embodiments of the present invention, a technology of managing user groups who play content provided by the cloud computing system 100 in a shared manner is provided.

While preferred embodiments of the present invention have been described using specific terms, such description is for illustrative purpose only, and it is to be understood by those skilled in the art that various modifications may be made in combinations of component elements and processing processes and such modifications are also within the scope of the present invention.

[Modification 1]

As described above, the content provided by the content providing apparatus 600 related with the embodiment is game content. It is also practicable for the content providing apparatus 600 to grant "medals" to particular users in order to activate the communication between users or stimulate the competition therebetween. "Medals" herein denote decorations so to speak that are granted within the cloud computing system 100; for example, a user who won a game with other users may get medals therefrom, thereby increasing the number of medals. Alternatively, a user who got scores higher than a predetermined number of scores in a particular piece of content may be granted a medal.

The skill level information suggestive of the skill level of a user with respect to a particular piece of content may be not only the number of times game content was provided or the length of time in which game content was provided and at least one of scores won in game content, stages cleared in game content, and the number of medals won from the content providing apparatus 600. Especially, it is thought that scores won in game content, stages cleared in game content, and the number of medals won directly reflect the skill level with respect to that content, so that it is preferable to use these factors as the skill level information.

REFERENCE SIGNS LIST

10 Server, 12 Database, 14 Content storage block, 16 User information storage block, 18 Database managing block, 100 Cloud computing system, 200 Client apparatus, 300 Network, 400 User organizing apparatus, 410 Publicizing block, 412 Public screen, 414 Execution screen, 416 Communication interface, 418 Join icon, 420 Browsing user identifying block, 430 Participation inviting block, 432 Notification screen, 434 Apply icon, 436 Refuse icon, 440 Information notifying block, 450 Controller controlling block, 460 Controller pool, 600 Content providing apparatus, 610 Virtual console, 620 Virtual controller port, 622 Management table.

INDUSTRIAL APPLICABILITY

The present invention is applicable to a user organizing apparatus, a user organizing method, and a cloud computing system.

The invention claimed is:

1. A user organizing apparatus, comprising:
 a participation inviting block configured, being connected to a content providing apparatus that makes a plurality of client apparatuses execute same content in a shared manner through a network, to invite users wanting to participate in said same content to be executed in a shared manner upon a notification from a promoter client apparatus that is one of said plurality of client apparatuses;
 an information notifying block configured to reference a user information storage block for storing content provided by said content providing apparatus, information for identifying a user to whom said content was provided, and skill level information suggestive of a skill level of said user with respect to said content by linking said content, said information, and said skill level information in order to get skill level information with respect to content for which participation was invited for each of users wanting participation accepted by said participation inviting block, thereby notifying said promoter client apparatus of the obtained skill level information; and
 a controller controlling block configured to allocate a virtual controller port in which an input signal for operating content provided by said content providing apparatus is entered to a client apparatus of a user accepted by said participation inviting block.

2. The user organizing apparatus according to claim 1, further comprising:
 a publicizing block configured to publicize an execution screen of content provided by said content providing apparatus through said network; and
 a browsing user identifying block configured to identify a user browsing an execution screen publicized by said publicizing block,
 wherein said participation inviting block notifies the user identified by said browsing user identifying block of participation invitation.

3. The user organizing apparatus according to claim 1, wherein said controller controlling block preferentially allocates a virtual controller port to a client apparatus of a user having a higher skill level with respect to content for which said user was invited for participation over a client apparatus of a user having a lower skill level with respect to said content.

4. The user organizing apparatus according to claim 1, wherein, upon an instruction from said promoter client apparatus, said controller controlling block changes client apparatuses to which a virtual controller port is allocated.

5. The user organizing apparatus according to claim 1, wherein:
 content provided by said content providing apparatus is game content, and
 said skill level information is at least one of the number of times game content was provided, a length of time in which game content was provided, game content score, the number of stages cleared in game content, and the number of medals obtained from said content providing apparatus.

6. A user organizing method to be executed by a computational resource of a cloud computing system for making a plurality of client apparatuses execute same content in a shared manner through a network, said user organizing method comprising the steps of:
 inviting, upon a notification from a promoter client apparatus that is one of said plurality of client apparatuses connected to said cloud computing system, users wanting to participate in said content to be executed in a shared manner;
 referencing a user information storage block for storing content provided by said cloud computing system, information for identifying a user to whom said content was provided, and skill level information suggestive of a skill level of said user with respect to said content by linking said content, said information, and said skill level information in order to get skill level information with respect to content for which participation was invited for each of users wanting participation accepted by said participation inviting block, thereby notifying said promoter client apparatus of the obtained skill level information; and
 allocating a virtual controller port in which an input signal for operating content provided by said cloud computing system is entered to a client apparatus of a user accepted for participation.

7. A cloud computing system having a plurality of client apparatuses and a plurality of computational resources for providing content to said plurality of client apparatuses through a network, said cloud computing system comprising:
 a virtual console configured to make said plurality of client apparatuses execute same content in a shared manner through said network;
 a virtual controller port configured to get an input signal for operating content provided by said cloud computing system and output the obtained content to said virtual console;
 a participation inviting block configured to invite users wanting to participate in content provided by a content providing block upon a notification from a promoter client apparatus that is one of said plurality of client apparatuses;
 a user information storage block configured to store content provided by said virtual console, information for identifying a user to whom said content was provided, and skill level information suggestive of a skill level of said user with respect to said content by linking said content, said information, and said skill level information;

an information notifying block configured to get skill level information of content for which participation was invited for each user wanting participation accepted by said participation inviting block by referencing said user information storage block and notify said promoter client apparatus of the obtained skill level information; and a controller controlling block configured to allocate said virtual controller port to a client apparatus of the user accepted by said participation inviting block.

8. The cloud computing system according to claim 7, wherein, when said controller controlling block allocates a controller port to a client apparatus during provision of content, said virtual console gets an input signal from the newly allocated controller port without interference with the provision of content.

* * * * *